(12) United States Patent  
Duncan

(10) Patent No.: US 7,297,083 B2
(45) Date of Patent: Nov. 20, 2007

(54) AXLE ASSEMBLY WITH ELECTRICALLY-DRIVEN DIFFERENTIAL

(75) Inventor: Bruce A. Duncan, Clinton Township, MI (US)

(73) Assignee: American Axel & Manufacturing, Inc., Detroit, MI (US)

( * ) Notice: Subject to any disclaimer, the term of this patent is extended or adjusted under 35 U.S.C. 154(b) by 0 days.

(21) Appl. No.: 11/541,946

(22) Filed: Oct. 2, 2006

(65) Prior Publication Data

US 2007/0026991 A1 Feb. 1, 2007

Related U.S. Application Data

(63) Continuation of application No. 10/978,870, filed on Oct. 29, 2004, now Pat. No. 7,115,058.

(51) Int. Cl.
*F16H 3/72* (2006.01)

(52) U.S. Cl. .......................................................... 475/5

(58) Field of Classification Search .................... 475/5, 475/6, 9
See application file for complete search history.

(56) References Cited

U.S. PATENT DOCUMENTS

| | | | |
|---|---|---|---|
| 1,065,413 A | 6/1913 | Whitney | |
| 1,167,052 A | 1/1916 | Douglas | |
| 4,130,172 A | 12/1978 | Moody | |
| 4,270,622 A | 6/1981 | Travis | |
| 4,562,894 A | 1/1986 | Yang | |
| 5,117,931 A | 6/1992 | Nishda | |
| 5,352,164 A | 10/1994 | Bensinger et al. | |
| 5,443,130 A | 8/1995 | Tanaka et al. | |
| 5,513,719 A | 5/1996 | Yamaguchi | |
| 5,620,387 A | 4/1997 | Janiszewski | |
| 5,637,048 A | 6/1997 | Maeda et al. | |
| 5,713,425 A | 2/1998 | Buschhaus et al. | |
| 5,823,281 A | 10/1998 | Yamaguchi et al. | |
| RE37,743 E | 6/2002 | Yang | |
| 6,431,298 B1 | 8/2002 | Ruppert, Jr. et al. | |
| 6,604,591 B2 | 8/2003 | Bowen et al. | |
| 6,715,291 B1 | 4/2004 | Liao | |
| 6,719,654 B2 | 4/2004 | Deichl et al. | |
| 6,851,502 B2 | 2/2005 | Sakazaki | |
| 7,115,058 B2 * | 10/2006 | Duncan ........................ 475/5 |
| 2001/0016532 A1 | 8/2001 | Jung | |
| 2002/0065163 A1 | 5/2002 | Deichl et al. | |

FOREIGN PATENT DOCUMENTS

| | | |
|---|---|---|
| EP | 1038722 | 12/1998 |
| GB | 2335404 | 3/1998 |
| WO | WO96/06749 | 3/1996 |

* cited by examiner

*Primary Examiner*—Dirk Wright
(74) *Attorney, Agent, or Firm*—Harness, Dickey & Pierce, P.L.C.

(57) ABSTRACT

An axle assembly for a motor vehicle. The assembly comprises a carrier housing and a differentially assembly rotatably mounted to the carrier housing. A ring gear is fixed to the differential assembly. A first pinion is in meshing engagement with the ring gear. The first pinion is driven by a combustion engine and is operable to drive the ring gear. An electric drive assembly is mounted to the carrier housing. The electric drive assembly comprises an electric motor and a second pinion. The second pinion is in meshing engagement with the ring gear. The second pinion is driven by the electric motor and is operable to drive the ring gear.

15 Claims, 4 Drawing Sheets

AXLE ASSEMBLY WITH ELECTRICALLY-DRIVEN DIFFERENTIAL

CROSS-REFERENCE TO RELATED APPLICATIONS

This is a continuation of U.S. patent application Ser. No. 10/978,870 filed Oct. 29, 2004, now U.S. Pat. No. 7,115,058, the entire disclosure of which is incorporated by reference.

FIELD OF THE INVENTION

The present invention relates to automotive axle assemblies. In particular, the present invention relates to a differential carrier assembly having an electric drive assembly.

BACKGROUND OF THE INVENTION

Automobile manufacturers are increasingly offering for sale automobiles powered by electric motors. Electric motors provide numerous advantages when compared to traditional combustion engines. For example, electric motors typically operate more efficiently and emit fewer undesirable emissions to the environment. However, combustion engines generally outperform electric motors in numerous other performance categories and typically provide higher horsepower per pound when the weight of batteries are taken into consideration. Further, automobiles propelled by electric motors are generally more expensive than automobiles propelled by combustion engines and need to be recharged more often than a vehicle propelled by a combustion engine needs to be refueled. Therefore, in spite of the advantages associated with electric motors, consumers are generally reluctant to purchase motor vehicles propelled solely by electric motors.

Accordingly, there is a need in the art for a motor vehicle that offers the advantages of an electric engine, such as increased efficiency, as well as the advantages of a combustion engine, such as reduced cost and enhanced performance.

SUMMARY OF THE INVENTION

In one form, the present invention provides for an axle assembly for a motor vehicle. The assembly comprises a carrier housing and a differential assembly that is rotatably mounted to the carrier housing. A ring gear is fixed to the differential assembly for rotation therewith. A first pinion is in meshing engagement with the ring gear. The first pinion is adapted to be driven by a combustion engine and is operable to drive the ring gear. An electric drive assembly is mounted to the carrier housing. The electric drive assembly includes an electric motor and a second pinion. The second pinion is in meshing engagement with the ring gear. The second pinion is selectively driven by the electric motor and is operable to drive the ring gear.

In another form, the present invention provides for an axle assembly for a motor vehicle. The axle assembly comprises a carrier housing and a ring gear rotatably mounted within the carrier housing. A first pinion is in meshing engagement with the ring gear and is operable to drive the ring gear. A second pinion is in meshing engagement with the ring gear. The second pinion is also operable to drive the ring gear. An electric motor is mounted to the carrier housing. A controller monitors the operating parameters of the motor vehicle. The controller selectively activates and deactivates the electric motor in response to the status of the operating parameters.

In yet another form, the present invention provides for a method for propelling a motor vehicle having both an internal combustion engine and an electric motor. The internal combustion engine is selectively coupled to a ring gear. The ring gear is rotatably mounted within a carrier housing. The electric motor is selectively operable to provide drive torque to the ring gear. The method comprises the following steps: drivingly interconnecting the ring gear and the combustion engine; drivingly interconnecting the ring and the electric motor; monitoring predetermined operating parameters of the motor vehicle using a controller; and selectively activating and deactivating the electric motor based on the status of the predetermined operating parameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
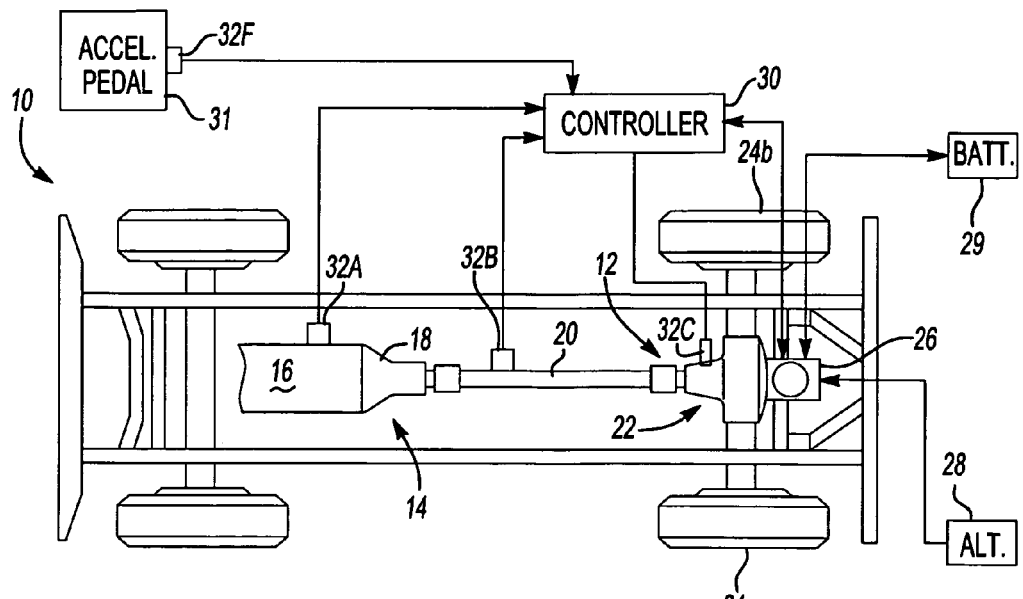
FIG. 1 is a schematic illustration of a motor vehicle constructed in accordance with the teachings of the present invention.

With reference to FIG. 1, a vehicle having an axle assembly constructed in accordance with the teachings of the present invention is generally indicated by reference numeral 10. The vehicle 10 includes a driveline 12 drivable via a connection to a power train 14. The power train 14 includes a combustion engine 16 and a transmission 18. The driveline 12 includes a drive shaft 20, a rear axle 22, and a pair of left and right wheels 24a and 24b, respectively. The rear axle 22 includes an electric drive assembly 26. A power supply, such as an alternator 28 or a battery 29, supplies electricity to the electric drive assembly 26. A controller 30 monitors inputs from sensors 32 to determine various operating parameters of the vehicle 10, such as vehicle speed, engine revolutions per minute (RPM), ring gear speed, throttle position as indicated by the position of an accelerator pedal 31, and other parameters as set forth below. The controller 30 processes the information gained using the sensors 32 and, as described further below, operates the electric drive assembly 26 based on this information.

Figure 2:
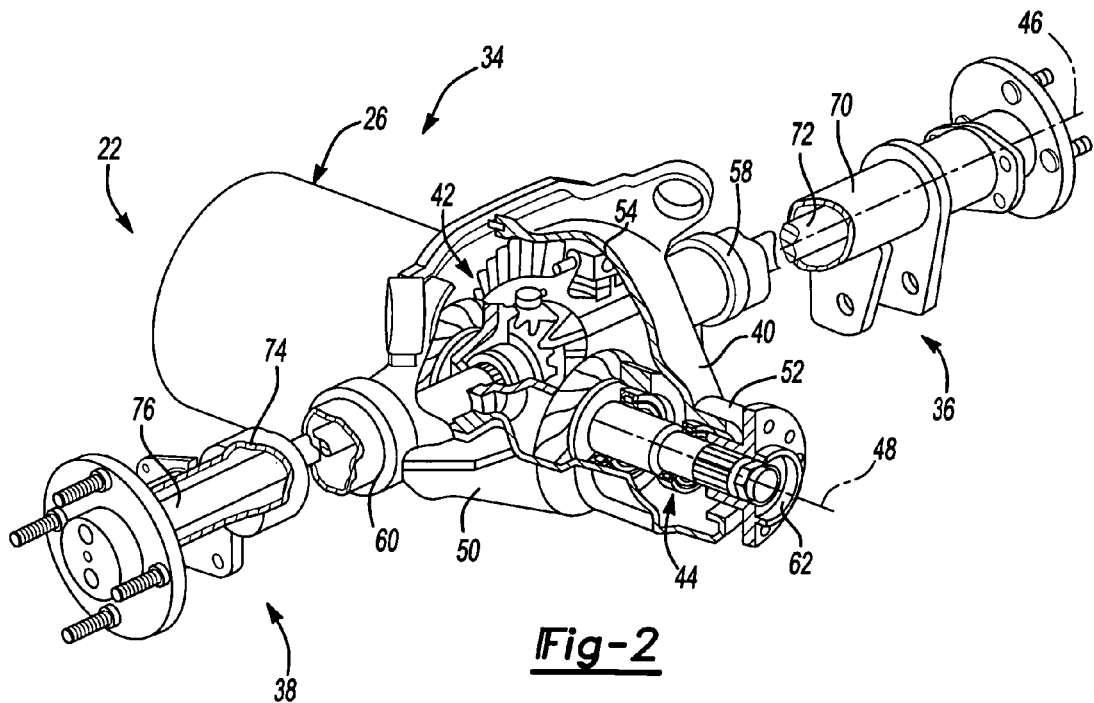
FIG. 2 is a fragmentary perspective view of a portion of the motor vehicle of FIG. 1, illustrating the rear axle in greater detail.
Figure 3:
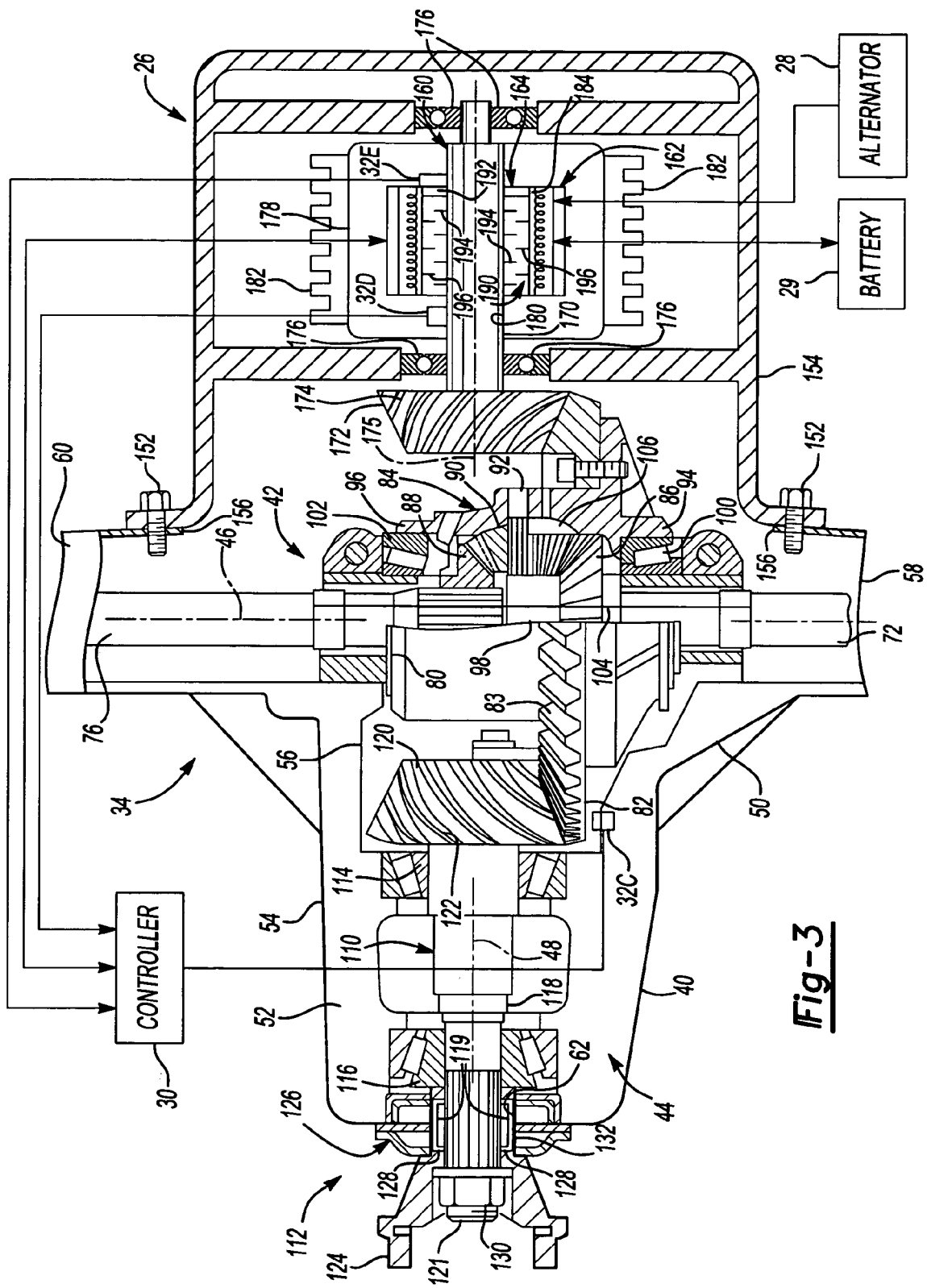
FIG. 3 is a section view of a carrier assembly of the motor vehicle of FIG. 1 equipped with an electric drive assembly according to an embodiment of the present invention.

FIGS. 2 and 3 depict the rear axle 22 in greater detail. Rear axle 22 includes a carrier assembly 34, a left axle shaft assembly 36, and a right axle shaft assembly 38. The carrier assembly 34 includes a carrier housing 40, a differential unit 42, and an input shaft assembly 44. The housing 40 supports the differential unit 42 for rotation about a first axis 46 and further supports the input shaft assembly 44 for rotation about a second axis 48 that is perpendicular to the first axis 46.

The housing 40 is initially formed in a suitable casting process and thereafter machined as required. The housing 40 includes a main body 50 and a pinion nose 52 extending from the main body 50. The housing 40 includes a wall member 54 that defines a central cavity 56 having a left axle aperture 58, a right axle aperture 60, and a first pinion aperture 62.

The left axle shaft assembly 36 includes a first axle tube 70 fixed to the left axle aperture 58 and a first axle half-shaft 72 that is supported for rotation about the first axis 46 by the first axle tube 70. Similarly, right axle shaft assembly 38 includes a second axle tube 74 that is fixed to right axle aperture 60 and which supports a second axle half-shaft 76 for rotation about the first axis 46.

FIG. 3 depicts the differential unit 42 being disposed within the central cavity 56 of the main body 50 of the housing 40. The differential unit 42 includes a case 80, a ring gear 82 that is fixed for rotation with the case 80, and a gear set 84 that is disposed within the case 80. Ring gear 82 includes a plurality of teeth 83. The gear set 84 includes first and second side gears 86 and 88 and a pair of differential pinions 90. Differential pinions 90 are rotatably supported on pinion shafts 92 that are mounted to the case 80. The case 80 includes a pair of trunnions 94 and 96 and a gear cavity 98. A pair of bearing assemblies 100 and 102 support the trunnions 94 and 96, respectively, for rotation about the first axis 46.

First axle half shaft 72 and second axle half shaft 76 extend through left and right axle apertures 58 and 60 respectively, where they are coupled for rotation about first axis 46 with first and second side gears 86 and 88, respectively. The case 80 is operable to support differential pinions 90 for rotation within the gear cavity 98 about one or more axes that are perpendicular to the first axis 46. The first and second side gears 86 and 88 each include a plurality of teeth 104 that meshingly engage teeth 106 that are formed on differential pinions 90.

The input shaft assembly 44 generally includes a first input pinion 110, a propeller shaft coupling flange assembly 112, and a pair of conventional bearing assemblies 114 and 116. Each of the bearing assemblies 114 and 116 include an outer race that engages the housing 40 in a press-fit manner. The bearing assemblies 114 and 116 cooperate with the housing 40 to support the first pinion 110 for rotation about the second axis 48.

The first pinion 110 includes a tail portion 118 and a head portion 120 integrally formed with one another. The head portion 120 includes a plurality of teeth 122. The teeth 122 meshingly engage the teeth 83 of the ring gear 82 to transfer torque from the power train 14 to the differential unit 42. A plurality of external splines 119 are formed on the tail portion 118. An externally threaded portion 121 is formed on a reduced diameter section at the end of the tail portion 118.

The coupling flange assembly 112 generally includes a pinion flange 124 and a seal assembly 126. The pinion flange 124 includes an internal spline 128 in engagement with external splines 119 of the first pinion 110. A nut 130 fixedly mounts the pinion flange 124 to the threaded portion 121 of the tail portion 118. At least a portion of the pinion flange 124 is located within the pinion nose 52.

The seal 126 is mounted at the first pinion aperture 62 by any suitable mounting means. The seal 126 includes an aperture 132 through which the first pinion 110 passes. The seal 126 is any suitable seal operable to prevent the passage of foreign materials, such as dirt and fluids, from entering the housing 40.

Figure 4:
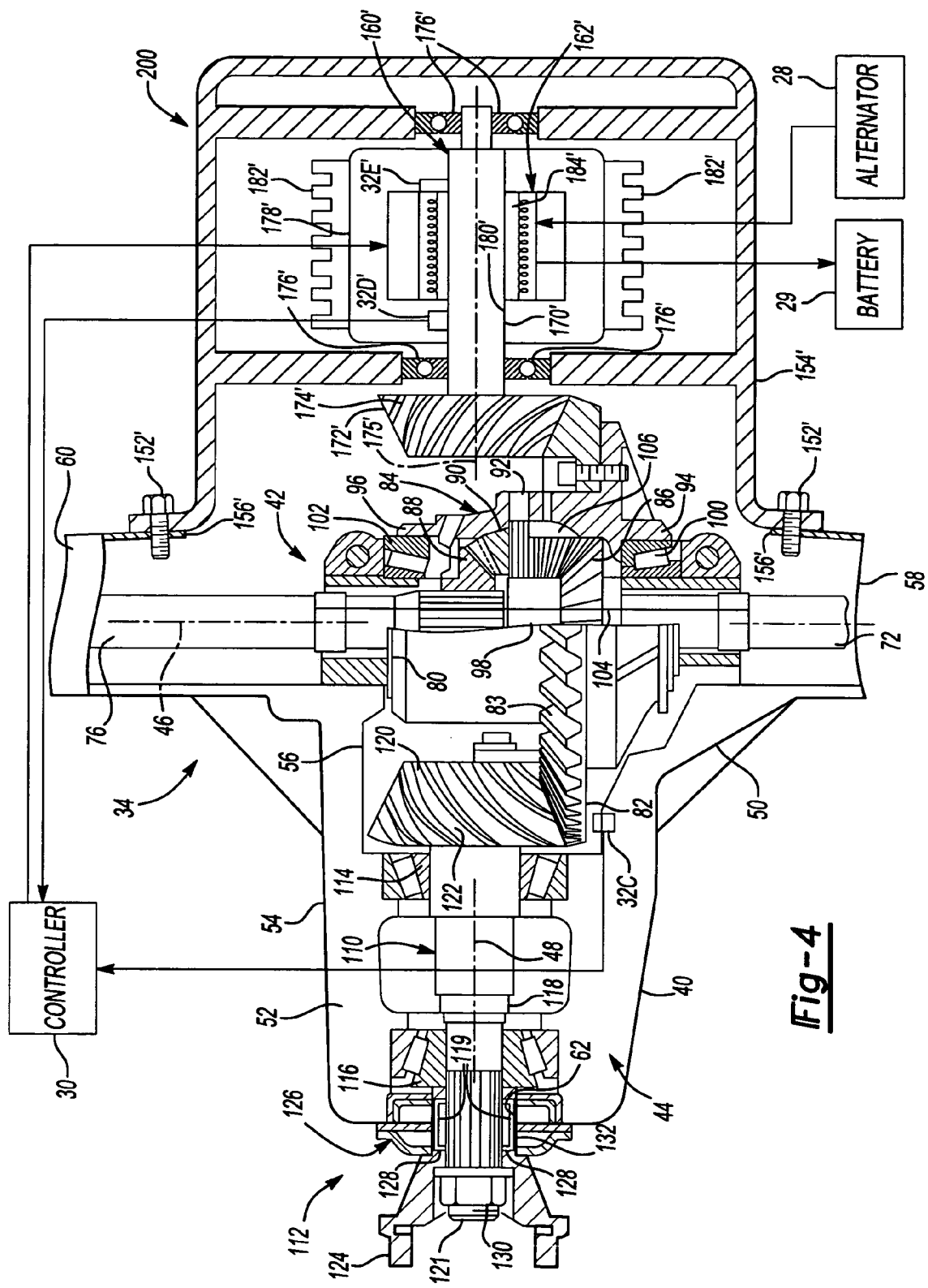
FIG. 4 is a section view of a carrier assembly of the motor vehicle of FIG. 1 equipped with an electric drive assembly according to another embodiment of the present invention.
Figure 5:
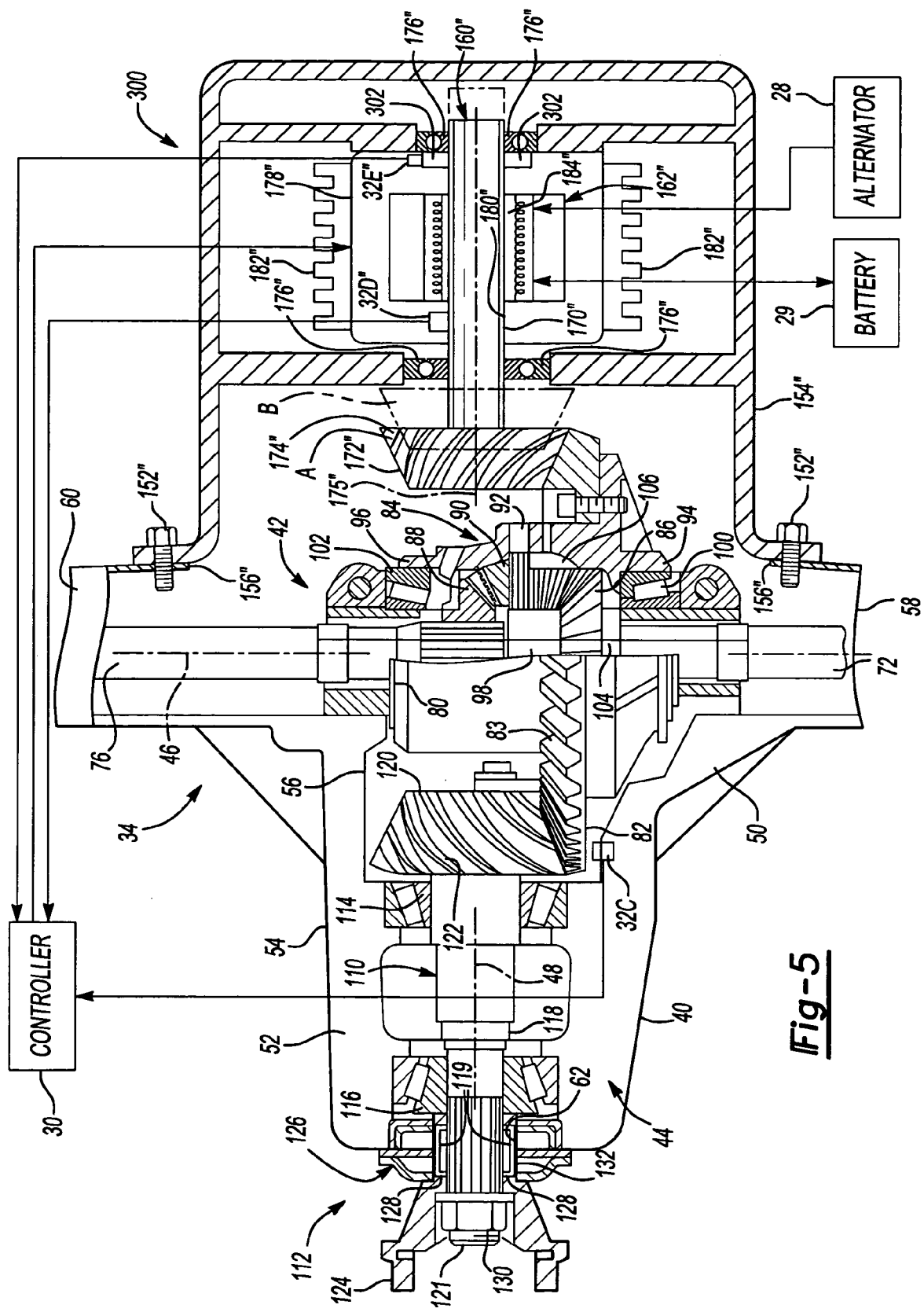
FIG. 5 is a section view of a carrier assembly of the motor vehicle of FIG. 1 equipped with an electric drive assembly according to another embodiment of the present invention.

The electric drive assembly 26 includes a support casing 150. The casing 150 can be integral with the carrier housing 40 or secured to the carrier housing 40 using any suitable fastening means. For example, and as illustrated in FIGS. 3 through 5, the casing 150 can be secured to the housing 40 by bolts 152 that extend through an outer wall 154 of the casing and engage the wall member 54 of the housing 40. The casing 150 can be secured to the housing 40 at a variety of different locations, as long as cooperation between components of the electric drive assembly 26 and the ring gear 82 is possible. The casing 150 can be made from any number of suitable materials, such as aluminum, steel or composite material.

The housing 40 includes an opening 156 to allow components of the electric drive assembly 26 to cooperate with the ring gear 82. The opening 156 can be specifically formed to accommodate the position of the assembly 26 or the opening 156 can be a pre-existing opening, such as a conventional carrier cover pan opening as illustrated. When the opening 156 is the conventional cover pan opening, the casing 150 can be secured to the housing 40 using the same bolt holes used to secure a conventional cover pan (not shown) to the cover pan opening.

The electric drive assembly 26 depicted in FIG. 3 generally comprises a second pinion 160, an electric motor 162, and a clutch assembly 164. The second pinion 160 generally includes a second pinion tail portion 170 and a second pinion head portion 172. The tail 170 of the second pinion 160 is integrally formed with the head portion 172. The head portion 172 includes a plurality of gear teeth 174. The tail 170 is rotatably mounted in the support casing 150 on one or more bearings 176 to permit rotation of the second pinion 160 about a third axis 175 that can be aligned with the second axis 48, as illustrated in FIG. 3. The second pinion 160 is mounted in a position such that the teeth 174 of the second pinion 160 are in meshing engagement with the teeth 83 of the ring gear 82. The gear teeth 174 can be of any suitable shape or size that allows the teeth to meshingly engage the teeth 83 of the ring gear 82, which also can be of any suitable shape or size. Furthermore, as illustrated, the axis 175 may be offset from axis 46 to form a hypoid gear arrangement.

The motor 162 and the clutch 164 are both seated within a motor housing 178. The motor housing 178 is rigidly coupled to an interior of the support casing 150 in any suitable manner. The motor housing 178 can also be integral with the casing 150. The motor housing 178 includes an interior aperture 180 that extends through the approximate center of the motor housing 178. The tail 170 extends through the interior aperture 180. The motor housing 178 also includes cooling fins 182. The cooling fins 182 are located on an outer surface of the housing 178 to increase the surface area of the motor housing 178 and assist in cooling the components of the housing 178, such as the electric motor 162 and the clutch 164 assembly.

The motor 162 is integral with or mounted within the motor housing 178 using any suitable mounting means. The motor 162 can be any suitable electric motor. The motor 162 includes a rotor 184. The rotor 184 is generally cylindrical and has a center aperture. The rotor 184 is rotationally mounted within the housing 178. The rotor 184 rotates about the third axis 175. The pinion tail 170 extends through the center aperture of the rotor 184. Thus, the rotor 184 may rotate about the pinion tail 170. The motor 162 is powered by any suitable power source, such as the alternator 28 or the battery 29.

The clutch assembly 164 generally includes a clutch pack 190 and an actuator 192. The clutch pack 190 includes a series of first clutch plates 194 and a series of second clutch plates 196. The first clutch plates 194 are splined to the tail 170 of the second pinion 160 and the second clutch plates 196 are splined to the rotor 184. The first and second clutch plates 194 and 196 are interleaved with one another. The first and second clutch plates 194 and 196 are axially slidable along the third axis 175. The actuator 192 is operable to axially slide the second clutch plates 196 into engagement with the first clutch plates 194. The actuator 192 can be any conventional actuator. For example, the actuator 192 can be a hydraulic actuator or an electric actuator, which could be powered by the alternator 28 or the battery 29. When the first and second clutch plates 194 and 196 engage each other, rotation of the rotor 184 effectuates rotation of the second pinion 160.

The controller 30 monitors various operating parameters of the vehicle 10 and controls the operation of the electric drive assembly 26. The controller 30 can by any suitable signal processing device or control device, such as a microcomputer. The controller receives inputs from various sensors 32, which monitor different parameters of the vehicle 10. The sensors 32 can each be any suitable conventional sensing device. Specifically, and as shown in FIGS. 1 and 3, the sensor 32A monitors the speed of the engine 16. The sensor 32B monitors the revolutions of the drive shaft 20 to determine the ground speed of the vehicle 10. The sensor 32C monitors the rotational speed of the ring gear 82. The sensor 32D monitors the rotational speed of the second pinion 160. The sensor 32E monitors the operation of the electric motor 162, the position of the clutch 164, and the position of the actuator 192. The sensor 32F monitors the throttle position as an indication of the amount of acceleration desired by the operator. The controller 30 is also operable to send commands to the engine 16 and the electric drive assembly 26 to control their operation.

The controller 30 activates the electric drive assembly 26 when certain predetermined operating conditions of the motor vehicle 10 are present. In some applications, the controller 30 is programmed to activate the electric drive assembly 26 when the vehicle 10 is accelerating from a standstill, such as between 0 mph and 10 mph, and at highway cruising speeds, such as above 55 mph. However, the controller 30 can be programmed to activate the electric drive assembly 26 in response to the occurrence of a variety of different conditions.

Operation of the electric drive assembly 26 when the controller 30 is programmed to activate the motor 162 at lower speeds (speeds less than 10 mph) and highway cruising speeds (speeds greater than 55 mph) will now be described in detail. If vehicle 10 is at a stationary position, or rolling at less than 10 mph, sensor 32B sends a signal to the controller 30 as such. Controller 30 also receives a signal from sensor 32F indicative of the throttle position. The controller then sends commands to the motor 162 and the actuator 192 to activate the motor 162 and the actuator 192 if vehicle acceleration is requested. Activation of the motor 162 causes the rotor 184 to rotate about the third axis of rotation 175. The activated actuator 192 axially slides the first clutch plates 194 and the second clutch plates 196 into engagement to drivingly interconnect the rotor 184 and the second pinion tail 170. Therefore, rotation of the rotor 184 effectuates rotation of the second pinion 160.

The controller 30 also controls the speed at which the rotor 184 and the second pinion 160 rotate. During acceleration of the vehicle 10, the second pinion 160 exerts a driving force on the ring gear 82 to supplement the driving force that the first pinion 110 exerts upon the ring gear 82. This condition allows decreasing the output required by the engine 16. To properly operate motor 162, the controller 30 identifies the speed of the engine 16, the speed of the ring gear 82 and the position of the throttle. Use of the motor 162 in this manner to decrease the load on the engine 16 advantageously improves the fuel economy of the vehicle 10 and prolongs the life of the engine 16.

After the controller 30 determines that the speed of the vehicle 10 is greater than 10 mph by processing inputs from the sensor 32B, the controller 30 sends a signal to the motor 162 to deactivate the motor 162. Even after the motor 162 is deactivated, the second pinion 160 continues to rotate due to the cooperation between the head 172 and the ring gear 82. At this time, motor 162 may be decoupled from second pinion 160 or may remain coupled to provide braking. For example, the controller 30 may be programmed to deactivate actuator 192 to decouple the second pinion 160 from the rotor 184. Alternatively, if the second pinion 160 and the rotor 184 remain coupled, then rotation of the second pinion due to rotation of the ring gear 82 results in rotation of the rotor 184, thus causing the motor 162 to act as a generator. Electricity generated by the motor 162 can be transferred to the battery 29 during a charging operation. If the second pinion 160 and the rotor 184 are decoupled then the second pinion 160 freely spins and no electricity is generated.

The electric drive assembly 26 can also serve as the sole source of propulsion for the vehicle 10. For example, after the vehicle 10 is propelled to a predetermined cruising speed by the engine 16, such as 55 mph, the controller 30 can activate the electric motor 162 to rotate the second pinion 160 in the manner set forth above. The controller 30 then commands the engine 16 to reduce its RPM output to idle and the rotational speed of the second pinion 160 is set to provide the entire driving force necessary to drive the ring gear 82 and propel the vehicle 10. At idle, the engine 16 is still operable to maintain the power steering, power brakes, and other vehicle accessories, but uses far less fuel and improves the vehicle's fuel economy. To accelerate the vehicle 10 after the engine 16 is brought to idle, the controller 30 can increase the rotational speed of the second pinion 160 and/or increase the speed of the engine 16 to increase the rotational speed of the first pinion 110. The motor 162 can also be used to provide the entire driving force necessary to drive the ring gear 82 to propel the vehicle 10 from a standstill.

FIG. 4 illustrates an electric drive assembly according to an additional embodiment at reference numeral 200. The electric drive assembly 200 is similar to the electric drive assembly 26 and like reference numbers are used to identify like elements of the embodiments with the like elements of the assembly 200 including the prime (') designation. The above description of the like elements and their operation equally applies to the assembly 200.

The assembly 200 is a simplified version of assembly 26 and does not include the clutch assembly 164. In the assembly 200, the rotor 184' of the motor 162' is rotationally fixed to the tail 170' of the second pinion 160'. Therefore, rotation of the second pinion 160' by the ring gear 82 when the motor 162' is not activated causes the rotor 184' to rotate. Controller 30 is operable to allow motor 162' to rotate freely or to function as a generator to generate electricity.

FIG. 5 illustrates an electric drive assembly according to an alternate embodiment at reference numeral 300. The electric drive assembly 300 is similar to the electric drive assemblies 26 and 200 and like reference numbers are used to identify like elements of the embodiments with the like elements of the assembly 300 including the double prime (") designation. The above description of the like elements equally applies to the assembly 300.

The assembly 300 is substantially similar to the assembly 200 except that the assembly 300 includes a pinion actuator 302. The actuator 302 can be any conventional actuator that is operable to linearly slide the second pinion 160" along the third axis 175" between a first position A, in which the head 172" meshingly engages the ring gear 82, and a second position B, in which the head 172" is spaced apart from the ring gear 82. In this embodiment, when torque is required from the motor 162", the controller 30 checks the position of the actuator 302 using the sensor 32E to make sure that the second pinion 160" is at position A. If the second pinion 160" is not at position A then the controller activates the actuator 302 to move the second pinion 160" to position A.

When the controller 30 determines that use of the motor 162" is not necessary, the controller 30 deactivates the motor 162". If the controller 30 determines that the battery 29, or other device, needs to be recharged, the controller 30 keeps the second pinion 160" at position A so that rotation of the second pinion 160" by the ring gear 82 will rotate the rotor 184" and cause the motor 162" to generate electricity that can be stored by the battery 29. If the controller 30 determines that the motor 162" does not need to be used to generate electricity, then the controller 30 signals the actuator 302 to move the second pinion 160" to position B so that the second pinion 160" is not in drivingly engaged with the ring gear 82. Use of the assembly 300 is advantageous because the second pinion 160" can be moved from engagement with the ring gear 82 when the motor 162" is not in use and, therefore, the second pinion 160" does not cause unnecessary drag on the ring gear 82, which can negatively effect fuel economy. The actuator 302 of the assembly 300 can also be provided in the assemblies 26 and 200 described above to move the second pinions 160 and 160' into and out of engagement with the ring gear 82 as desired.

One of ordinary skill in the art will recognize that the electric drive assemblies 26, 200, and 300 of the present invention can be adapted for use with most any type of motor vehicle. For example, the assemblies 26, 200, and 300 can be adapted to vehicles having front wheel drive, rear wheel drive, two wheel drive, four wheel drive, and all wheel drive systems. Further, the assemblies 26, 200, and 300 may be mounted to existing carrier assemblies of previously manufactured vehicles. Also, the assemblies 26, 200, and 300 may be provided with new carrier assemblies of new vehicles.

Therefore, the electric drive assembly of the present invention is operable to increase the fuel economy of the vehicle 10 and decrease the load on the engine 16 by driving a second pinion 160 that is in cooperation with the ring gear 82. The driving force exerted by the second pinion 160 replaces or supplements the driving force of the first pinion 110 and thus the output required of the engine 16 is decreased. The electric motor 162 may be in operation at all times or only at select times, such as during acceleration when the demands of the engine 16 are the greatest or during highway cruising speeds when the electric motor 162 is capable of solely propelling the vehicle 10 with minimal performance loss. The electric drive assembly offers such advantages while still providing the user with the performance advantages of a traditional combustion engine.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A motor vehicle, comprising:
  a powertrain for generating drive torque;
  a driveline transmitting drive torque from said powertrain to a pair of wheels, said driveline including an axle assembly having a pair of axleshafts coupled to said wheels and a differential unit driving said axleshafts, and a shaft assembly operably coupling said powertrain to said differential unit, said shaft assembly including a first pinion meshed with a ring gear driving said differential unit; and
  an electric drive assembly including a second pinion meshed with said ring gear, an electric motor and a clutch assembly for selectively interconnecting said electric motor to said second pinion, said first and second pinions aligned to rotate generally about a common axis of rotation.

2. The motor vehicle of claim 1 further including an actuator operable to selectively provide an application force to said clutch assembly to drivingly interconnect said electric motor and said second pinion.

3. The motor vehicle of claim 1 wherein said electric drive assembly is mounted to a cover pan opening of a carrier housing associated with said axle assembly.

4. The motor vehicle of claim 1 further comprising a controller operable to control the operation of said electric motor.

5. The motor vehicle of claim 1 wherein said electric motor selectively operates as a generator to generate electricity.

6. The motor vehicle of claim 1 wherein said second pinion is movable between a first position in which said second pinion drivingly engages said ring gear and a second position in which said second pinion is displaced from meshed engagement with said ring gear.

7. A motor vehicle, comprising:
  a powertrain for generating drive torque;
  a driveline transmitting drive torque from said powertrain to a pair of wheels, said driveline including an axle assembly having a pair of axleshafts coupled to said wheels and a differential unit driving said axleshafts, and a shaft assembly operably coupling said powertrain to said differential unit, said shaft assembly including a first pinion meshed with a ring gear driving said differential unit;
  an electric drive assembly including a second pinion meshed with said ring gear, an electric motor and a clutch assembly for selectively drivingly interconnecting said electric motor to said second pinion, said first and second pinions aligned to rotate generally about a common axis of rotation; and a controller monitoring operating parameters of said vehicle and selectively actuating said electric motor.

8. The motor vehicle of claim 7 wherein said electric drive assembly is mounted to a cover pan opening of a carrier housing associated with said axle assembly.

9. A motor vehicle, comprising:

a powertrain for generating drive torque;

a driveline for transmitting drive torque from said powertrain to a pair of wheels, said driveline including an axle assembly having a housing defining a central cavity and an opening, a differential unit rotatably supported with said central cavity, a pair of axleshafts coupling said differential unit to said wheels, a ring gear fixed to said differential unit and a first pinion driven by said powertrain and meshed with said ring gear; and an electric drive assembly including an electric motor, a second pinion extending through said opening in said housing so as to mesh with said ring gear, and a clutch assembly for selectively drivingly interconnecting said electric motor to said second pinion.

10. The motor vehicle of claim 9 wherein said electric drive assembly is mounted to said housing.

11. A motor vehicle, comprising:

a powertrain for generating drive torque;

a driveline for transmitting drive torque from said powertrain to a pair of wheels, said driveline including an axle assembly having a housing, a differential rotatably supported by said housing, a ring gear fixed for rotation with said differential, and a first pinion meshed with said ring gear and driven by said powertrain for driving said ring gear; and an electric drive assembly mounted to said housing, said electric drive assembly including an electric motor, a second pinion meshed with said ring gear, and a clutch assembly operable for selectively coupling said electric motor to said second pinion for driving said ring gear.

12. A motor vehicle, comprising:

a powertrain for generating drive torque;

a driveline for transmitting drive torque from said powertrain to a pair of wheels, said driveline including an axle assembly having a carrier housing, a differential assembly rotatably supported by said carrier housing, a ring gear fixed for rotation with said differential assembly, and a first pinion meshed with said ring gear and driven by said powertrain for driving said ring gear; and an electric drive assembly including an electric motor and a second pinion selectively driven by said electric motor for driving said ring gear, said electric drive assembly is mounted to a cover a pan opening associated with said carrier housing.

13. A motor vehicle, comprising:

a powertrain for generating drive torque;

an axle assembly including a housing defining a central cavity and first and second openings, a differential rotatably supported in said central cavity, said differential including an input member, a first output member driving a first wheel and a second output member driving a second wheel, a ring gear fixed for rotation with said input member of said differential, a first pinion shaft extending through said first opening in said housing and having a first end driven by said powertrain and a second end defining a first pinion gear that is meshed with said ring gear, and a second pinion shaft extending through said second opening in said housing and having a first end and a second end defining a second pinion gear that is meshed with said ring gear; and an electric drive assembly mounted to said housing and including an electric motor and a clutch operable for selectively coupling said electric motor to said first end of said second pinion shaft.

14. A motor vehicle, comprising:

a powertrain for generating drive torque;

an axle assembly having a housing, a differential unit rotatably supported in said housing, a ring gear driving said differential unit, a pair of axleshafts driven by said differential unit, and a first shaft driven by said powertrain and having a first pinion driving said ring gear; and an electric drive assembly mounted to a cover pan opening of said housing and including a second shaft having a second pinion driving said ring gear and an electric motor driving said second shaft.

15. The motor vehicle of claim 14 wherein said electric drive assembly further includes a clutch assembly for releasably coupling an output of said electric motor to said second shaft.

* * * * *